US012103150B2

(12) United States Patent
Kondo et al.

(10) Patent No.: US 12,103,150 B2
(45) Date of Patent: Oct. 1, 2024

(54) DRIVING TOOL

(71) Applicant: MAX CO., LTD., Tokyo (JP)

(72) Inventors: Yoshihiko Kondo, Tokyo (JP); Tetsuya Ohno, Tokyo (JP); Takashi Suzuki, Tokyo (JP); Takanari Azami, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 17/740,896

(22) Filed: May 10, 2022

(65) Prior Publication Data

US 2022/0355455 A1 Nov. 10, 2022

(30) Foreign Application Priority Data

May 10, 2021 (JP) ................................ 2021-079625

(51) Int. Cl.
*B25C 1/06* (2006.01)

(52) U.S. Cl.
CPC .................................... *B25C 1/06* (2013.01)

(58) Field of Classification Search
CPC .... B25C 1/06; B25C 1/00; B25C 1/02; B25C 1/008; B25C 5/15
See application file for complete search history.

(56) References Cited

U.S. PATENT DOCUMENTS

| | | | | |
|---|---|---|---|---|
| 2008/0296339 | A1 | 12/2008 | Fielitz et al. | |
| 2009/0078734 | A1 | 3/2009 | Chang | |
| 2012/0211540 | A1* | 8/2012 | Kondou | B25C 1/00 227/140 |
| 2015/0258671 | A1 | 9/2015 | Kondou et al. | |
| 2017/0036332 | A1 | 2/2017 | Kondou et al. | |
| 2017/0129085 | A1 | 5/2017 | Miyashita et al. | |
| 2017/0297187 | A1 | 10/2017 | Nishikawa et al. | |
| 2019/0299379 | A1 | 10/2019 | Kondou et al. | |

FOREIGN PATENT DOCUMENTS

| | | | |
|---|---|---|---|
| EP | 3685964 | A1 | 7/2020 |
| JP | 2008-260124 | A | 10/2008 |
| JP | 5696671 | B2 | 4/2015 |
| JP | 2017-087414 | A | 5/2017 |
| WO | 2016-031716 | A | 3/2016 |

OTHER PUBLICATIONS

Extended European Search Report for EP Application No. 22172445.3 dated Oct. 7, 2022. (7 pp.).

* cited by examiner

*Primary Examiner* — Veronica Martin
(74) *Attorney, Agent, or Firm* — Banner & Witcoff, Ltd.

(57) ABSTRACT

A driving tool includes: a body provided with an outlet where a fastener is driven; an urging member attached to the body; and a plunger movable in a projecting direction toward the outlet by extension of the urging member. An urging force in the projecting direction acts on the body from the urging member when the urging member is extended.

20 Claims, 7 Drawing Sheets

DRIVING TOOL

CROSS-REFERENCE TO RELATED APPLICATIONS

This application is based upon and claims the benefit of priority from prior Japanese patent application No. 2021-079625, filed on May 10, 2021, the entire contents of which are incorporated herein by reference.

TECHNICAL FIELD

The present invention relates to a driving tool.

BACKGROUND ART

A driving tool configured to drive a plunger by using a motor so as to drive nails, studs, staples, pins, and the like (hereinafter referred to as "fasteners") is known.

JP-A-2008-260124 (hereinafter, referred to as Patent Literature 1) describes a driving tool in which reaction is reduced even when a strong drive spring is used. Specifically, there is described a driving tool in which two identical driving elements are extended in opposite directions to reduce reaction. Forces generated by the two driving elements are transmitted to a plunger by using a movable pulley and a belt.

US Patent Application Publication No. 2009/0078734 Specification (hereinafter, referred to as Patent Literature 2) describes a driving tool equipped with a reaction reducing mechanism configured to reduce reaction. Specifically, there is described a driving tool in which reaction is reduced by moving a balancer (sometimes referred to as a counterweight) in a direction opposite to a moving direction of a plunger by rack-and-pinion or a pulley.

WO2016/031716 (hereinafter, referred to as Patent Literature 3) describes a driving tool in which reaction occurring in a driving tool body is reduced. Specifically, there is described a driving tool in which a plunger, an elastic member, and a balancer are arranged in series in this order, one end of the elastic member urges the plunger while the other end urges the balancer so as to reduce reaction.

JP-A-2017-87414 (hereinafter, referred to as Patent Literature 4) describes a driving tool equipped with a reaction reducing mechanism configured to reduce reaction. Specifically, there is described a driving tool in which reaction is reduced by moving a balancer in a direction opposite to a moving direction of a plunger by rack-and-pinion.

Japanese Patent No. 5696671 (hereinafter, referred to as Patent Literature 5) describes a driving tool equipped with a mechanism configured to absorb reaction at the time of driving. Specifically, there is described a driving tool provided with a balancer urging member configured to urge a balancer in a direction away from an outlet independently of a driving force of a driver.

However, in the driving tool described in Patent Literature 1, it is necessary to provide the two identical driving elements extending in directions opposite to each other.

The driving tools described in Patent Literatures 2 to 5 each require a mechanism in which a heavy balancer is prepared and moved in a direction opposite to a plunger.

Therefore, an object of the present invention is to provide a driving tool capable of reducing reaction with a small or lightweight configuration without requiring the above-described configurations.

SUMMARY

The present application discloses a driving tool. The driving tool includes: a body provided with an outlet where a fastener is driven; an urging member attached to the body; and a plunger movable in a projecting direction toward the outlet by extension of the urging member. An urging force in the projecting direction acts on the body from the urging member when the urging member is extended.

According to such a driving tool, in the driving tool including the plunger movable by the extension of the urging member, an urging force in the projecting direction acts on the body from the urging member when the urging member is extended. Therefore, it is possible to reduce reaction that acts on the body in a direction opposite to a moving direction of the plunger as reaction of the movement of the plunger and striking of the fastener struck by the plunger.

The term "urging member" in the present invention refers to a member that moves the plunger in the projecting direction toward the outlet by extension. Therefore, other urging members mounted on the driving tool do not correspond to the "urging member" in the present invention. For example, since an urging member that urges a trigger is not a member that moves the plunger in the projecting direction toward the outlet by extension, such an urging member does not correspond to the "urging member" in the present invention.

The "urging member" of such a driving tool may be constituted by a single member (for example, a single spring).

The "urging member" of such a driving tool may also be constituted by a plurality of members (for example, a plurality of springs). At this time, the driving tool includes a plurality of members that move the plunger in the projecting direction toward the outlet by extension.

In a case where the driving tool includes a plurality of members that move the plunger in the projecting direction toward the outlet by extension while directions of urging forces generated by the plurality of members are the same, the plurality of members correspond to the "urging member" of the present invention. For example, when a plurality of springs are provided in parallel instead of providing a single spring, the plurality of springs correspond to the "urging member" of the present invention. In addition, a resultant force of the urging forces generated by the plurality of springs corresponds to the "urging force" acting on the body from the "urging member".

In a case where the driving tool includes a plurality of members that move the plunger in the projecting direction toward the outlet by extension while directions of urging forces generated by the plurality of members are different from each other, a resultant force of the urging forces generated by the plurality of members corresponds to the "urging force" that acts on the body from the "urging member". For example, a spring that generates a relatively large urging force and a spring that generates a relatively small urging force in an auxiliary manner may be mounted on the driving tool. In such a case, a resultant force of the large urging force and the small urging force corresponds to the "urging force" acting on the body from the "urging member".

Here, the urging member may be configured to extend in a separating direction away from the outlet.

According to such a driving tool, since the urging member extends in the separating direction away from the outlet, a center of gravity of the urging member moves in the separating direction relative to the body when the urging member is extended. Therefore, it is possible to reduce the reaction that acts on the body in the direction opposite to the moving direction of the plunger as the reaction of the movement of the plunger.

Further, the driving tool may further include: a connection member, one end side thereof being attached to a separation-side end portion side of the urging member, which moves in a direction in which the urging member is extended, the other end side thereof being attached to the plunger; and a direction changing member configured to engage with the connection member between the one end side and the other end side so as to change a direction of a force acting on the connection member.

Here, the "connection member" may be a string-shaped member (hereinafter, referred to as the "string-shaped member"). The "string-shaped member" includes a member formed in an elongated linear shape such as a wire, a belt, or a rope.

Here, the phrase "the one end side of the string-shaped member is attached to the urging member" includes a case where an end of the string-shaped member is not necessarily in contact with the urging member while a region on the one end side of the string-shaped member is attached to the urging member. For example, the string-shaped member may be attached by being wound around the urging member, the moving member, or other members. Such a case corresponds to the case where the end of the string-shaped member is not necessarily in contact with the urging member while the region on the one end side of the string-shaped member is attached to the urging member.

In addition, a method for "attaching" the "connection member" or the "string-shaped member" to the "urging member" may be achieved by various known methods capable of transmitting forces. In addition to the above-described method of winding the string-shaped member around the urging member, various methods such as a method of using an adhesive, a method of attaching via another member, and a method of integrating the string-shaped member and the urging member may be employed. When attached via another member, the one end side of the string-shaped member is attached to the member (for example, by forming a through hole in the member and passing the string-shaped member through the through hole so as to attach the one end side of the string-shaped member to the member) while the urging member is attached to the member (for example, the urging member is attached to the member by an adhesive).

Here, the phrase "the string-shaped member is attached to the separation-side end portion side of the urging member, which moves in the direction in which the urging member is extended" includes a case where, among portions of the urging member, an end of the urging member is not necessarily in contact with the string-shaped member while an end-portion-side region that moves in the extension direction is attached to the urging member directly or indirectly via another component such as a moving member.

In addition, the "direction changing member" includes a reversing mechanism using a pulley, a gear, or the like. When the "direction changing member" is a pulley, a direction in which the string-shaped member is extended can be changed by hooking the string-shaped member on the pulley. Therefore, it is possible to convert directions of a force acting on the string-shaped member from a member attached to the one end side of the string-shaped member (or a reaction force thereof) and a force acting on the string-shaped member from a member attached to the other end side of the string-shaped member (or a reaction force thereof).

A similar effect may be achieved by using a known reversing mechanism such as a gear as the "direction changing member".

In such a driving tool, the direction changing member may be disposed between the urging member and the outlet in the projecting direction. For example, the direction changing member may be provided at a position advanced in the projecting direction relative to the urging member (including both a case where the direction changing member is close to the urging member and a case where the direction changing member is spaced apart from the urging member). However, the urging member and the direction changing member are not prevented from being provided at different positions in a direction perpendicular to the projecting direction.

According to such a configuration, by using the "string-shaped member" and the "direction changing member", a distance between the plunger and the urging member in the projecting direction can be narrowed, or the plunger and the urging member can be arranged in such a manner that a moving range of the plunger and an extension range of the urging member at least partially overlap each other in the projecting direction as compared with a case where such members are not used, and therefore, a total height of the driving tool in the projecting direction can be reduced.

Such a driving tool may also be configured such that the urging member is configured to extend on a first axis, the plunger is configured to move on a second axis when the urging member is extended on the first axis, and, in a side view as viewed from a direction perpendicular to the direction in which the urging member is extended, the first axis and the second axis overlap each other.

Here, the phrase "the first axis and the second axis overlap each other in the side view as viewed from the direction perpendicular to the direction in which the urging member is extended" means that "the first axis and the second axis overlap each other" in a "side view" as viewed from any one direction that is "perpendicular to the direction in which the urging member is extended".

Therefore, a case where the first axis and the second axis do not overlap with each other in a certain side view (for example, a front view) while the first axis and the second axis overlap with each other in a different side view (for example, a right side view) is included.

According to such a configuration, in a side view in which at least the first axis and the second axis overlap each other, the plunger and the urging member are disposed at positions spaced apart from each other, and thus it is possible to reduce a moment generated due to striking of the fastener.

In addition, the first axis and the second axis may be the same. At this time, the first axis and the second axis overlap each other in the "side view" as viewed from any direction that is "perpendicular to the direction in which the urging member is extended".

Further, the urging member may be provided in a region surrounded by the plunger in a top view as viewed from a direction parallel to the direction in which the urging member is extended. According to such a configuration, it is still possible to reduce the moment generated due to the striking of the fastener by disposing the plunger and the urging member at positions close to each other. This configuration can be applied to the driving tool in place of or together with the configuration in which "the first axis and the second axis overlap each other in the side view as viewed from the direction perpendicular to the direction in which the urging member is extended".

In addition, even when the first axis and the second axis do not overlap each other in the side view, the moment can be reduced by bringing the urging member and the plunger close to each other. For example, in the top view as viewed from the direction parallel to the direction in which the urging member is extended, a minimum distance (minimum interval) between the urging member and the plunger may be configured to be smaller than a maximum length of the urging member in the top view (a diameter when the urging member is a coil spring), preferably smaller than a half of the maximum length of the urging member in the top view.

Further, such a driving tool may also be configured such that in a first state where the urging member is compressed, a distance between the projecting-side end portion of the urging member, which is attached to the body, and the center of gravity of the urging member is shorter than a distance between the projecting-side end portion and the plunger, and in a second state where the urging member is extended, the distance between the projecting-side end portion and the center of gravity of the urging member is longer than the distance between the projecting-side end portion and the plunger.

Such a driving tool may also be configured such that when the first state where the urging member is compressed is shifted to the second state where the urging member is extended, a direction in which the center of gravity of the urging member is moved and a direction in which the plunger is moved are opposite to each other.

Here, in the case where the "urging member" is constituted by a plurality of members (for example, a plurality of springs), the term "center of gravity of the urging member" corresponds to a center of gravity of the entire urging member including the plurality of members as constituent elements.

Further, the present application discloses a driving tool including: a body provided with an outlet where a fastener is driven; an urging member attached to the body; and a plunger movable in a projecting direction toward the outlet by extension of the urging member. An urging force in the projecting direction acts on the body from the urging member when the urging member is extended. In a first state where the urging member is compressed, a distance between a projecting-side end portion of the urging member, which is attached to the body, and an extension-side end portion of the urging member is smaller than a distance between the projecting-side end portion and an end portion, which is located in a separating direction away from the outlet, of the plunger. In a second state where the urging member is extended, the distance between the projecting-side end portion and the extension-side end portion of the urging member is larger than the distance between the projecting-side end portion and the end portion, which is located in the separating direction away from the outlet, of the plunger.

In addition, according to one aspect of the present disclosure, the driving tool may further include a moving member configured to engage with the separation-side end portion side of the urging member and the one end side of the connection member (including the string-shaped member), and the connection member (including the string-shaped member) may be configured to be attached to the separation-side end portion side by the moving member.

Here, the term "moving member" is a generic term for members that are disposed on the separation-side end portion side of the urging member so as to move together with the separation-side end portion of the urging member. Therefore, when the urging member is compressed, the moving member moves in a compression direction together, and when the urging member is extended, the moving member moves in an extension direction together. The moving member may include a plurality of members that move together.

Alternatively, the driving tool may include a connection member (including the string-shaped member) whose both end sides are respectively attached to the separation-side end portion side of the urging member, which moves in the direction in which the urging member is extended, and whose intermediate portion is engaged with the plunger.

According to such a configuration, since the both end sides of the connection member (including the string-shaped member) are respectively attached to the separation side of the urging member, it is possible to improve balance of forces acting between the connection member (including the string-shaped member) and the separating end portion side of the urging member.

At this time, the driving tool may include a moving member that is attached to the separating end portion side of the urging member by adhesion or the like as a unit configured to attach the connection member (including the string-shaped member) and the separating end portion side of the urging member. By further attaching the both end sides of the connection member (the string-shaped member) to the moving member, it is possible to attach the connection member (string-shaped member) and the separating end portion side of the urging member.

In addition, the present application discloses a second driving tool. The driving tool includes: a body provided with an outlet where a fastener is driven; an urging member including a projecting-side end portion that is attached to the body and a separation-side end portion that is not attached to the body; a plunger movable in a projecting direction toward the outlet by extension of the urging member. In a first state where the urging member is compressed, a distance between the projecting-side end portion and a center of gravity of the urging member is shorter than a distance between the projecting-side end portion and the plunger, and in a second state where the urging member is extended, the distance between the projecting-side end portion and the center of gravity of the urging member is longer than the distance between the projecting-side end portion and the plunger.

According to such a driving tool, a region in which the urging member is extended and a region in which the plunger is moved at least partially overlap each other, and thus it is possible to reduce a size of the driving tool.

Here, the term "distance between the projecting-side end portion and the plunger" may be a distance between the projecting-side end portion and any portion of the plunger, and may be, for example, a distance between the projecting-side end portion and an end portion, which is located in the separating direction away from the outlet, of the plunger.

The driving tool may be combined with the above-described configuration. Such a driving tool includes: a body provided with an outlet where a fastener is driven; an urging member including a projecting-side end portion that is attached to the body and a separation-side end portion that is not attached to the body; a moving member configured to engage with the separation-side end portion; and a plunger movable in a projecting direction toward the outlet by extension of the urging member. In a first state where the urging member is compressed, a distance between the projecting-side end portion and the moving member is shorter than a distance between the projecting-side end portion and the plunger. In a second state where the urging member is extended, the distance between the projecting-side end portion and the moving member is longer than the distance between the projecting-side end portion and the plunger. An urging force in the projecting direction acts on the body from the urging member when the urging member is extended.

Further, the present application discloses a third driving tool. The driving tool includes: a body provided with an outlet where a fastener is driven; an urging member including a projecting-side end portion that is attached to the body and a separation-side end portion that is not attached to the body; a plunger movable in a projecting direction toward the outlet by extension of the urging member. In a first state where the urging member is compressed, a distance between the projecting-side end portion and a center of gravity of the urging member is shorter than a distance between the projecting-side end portion and the plunger, and in a second state where the urging member is extended, the distance between the projecting-side end portion and the center of gravity of the urging member is longer than the distance between the projecting-side end portion and the plunger.

According to such a driving tool, a region in which the center of gravity is moved due to the extension of the urging member and a region in which the plunger is moved at least partially overlap each other, and thus it is possible to reduce a size of the driving tool. In addition, since the center of gravity of the urging member moves in the separating direction relative to the body, it is possible to reduce reaction that acts on the body in a direction opposite to a moving direction of the plunger as reaction of the movement of the plunger.

Here, the term "distance between the projecting-side end portion and the plunger" may be a distance between the projecting-side end portion and any portion of the plunger, and may be, for example, a distance between the projecting-side end portion and a center of gravity of the plunger.

Here, the driving tool may further include: a connection member (including the string-shaped member), one end side thereof being attached to a separation-side end portion side of the urging member, which moves in a direction in which the urging member is extended, while the other end side thereof is attached to the plunger; and a direction changing member configured to engage with the connection member (string-shaped member) between the one end side and the other end side so as to change a direction of a force acting on the connection member (string-shaped member).

The present application discloses a fourth driving tool. The driving tool includes: a body provided with an outlet where a fastener is driven; an urging member including a projecting-side end portion that is attached to the body and a separation-side end portion that is not attached to the body; and a plunger configured to project the fastener from the outlet when the urging member is extended. When a first state where the urging member is compressed is shifted to a second state where the urging member is extended, a direction in which a center of gravity of the urging member is moved and a direction in which the plunger is moved are opposite to each other.

According to such a driving tool, since the moving direction of the center of gravity of the urging member and the moving direction of the plunger are opposite to each other, it is possible to reduce reaction that acts on the body in the direction opposite to the moving direction of the plunger as reaction of the movement of the plunger.

Here, the term "moving direction of the plunger" may be a moving direction of any portion of the plunger, for example, a moving direction of a center of gravity of the plunger.

As described above, in a case where the "urging member" is constituted by a plurality of members (for example, a plurality of springs), the term "center of gravity of the urging member" corresponds to a center of gravity of the entire urging member including the plurality of members as constituent elements.

Here, the driving tool may further include: a connection member (including the string-shaped member), one end side thereof being attached to a separation-side end portion side of the urging member, which moves in a direction in which the urging member is extended, while the other end side thereof is attached to the plunger; and a direction changing member configured to engage with the connection member (string-shaped member) between the one end side and the other end side so as to change a direction of a force acting on the connection member (string-shaped member). The present application discloses a fifth driving tool. The driving tool includes: an urging member; a plunger movable by extension of the urging member; and a body including a body portion that accommodates the urging member and the plunger, and a grip portion connected to the body portion. The urging member is configured such that when a second state where the urging member is extended is shifted to a first state where the urging member is compressed, an end portion of the urging member, which is located in a separating direction away from an outlet, is compressed so as to pass through a position where a connection portion connecting the grip portion and the body portion is provided in a projecting direction, and when the first state is shifted to the second state, the end portion of the urging member is extended in the separating direction so as to pass through the position where the connection portion is provided in the projecting direction. The urging member is configured such that According to such a driving tool, it is possible to reduce a moment acting on the grip portion due to the extension of the urging member. Further, since the urging member extends in the separating direction away from the outlet, a moving direction of a center of gravity of the urging member and a moving direction of the plunger are opposite to each other. Therefore, it is possible to reduce reaction that acts on the body in the direction opposite to the moving direction of the plunger as reaction of the movement of the plunger.

Here, the term "position where the connection portion connecting the grip portion and the body portion in the projecting direction is provided" corresponds to a position of a center of a region where the connection portion extends in the projecting direction in a case where the connection portion extends in the projecting direction.

In the above driving tool, the plunger may be configured such that a separating-direction end portion of the plunger passes through the position where the connection portion is provided in the projecting direction when shifting from the first state to the second state or when shifting from the second state to the first state.

The present application discloses a seventh driving tool. The driving tool includes a body provided with an outlet where a fastener is driven; an urging member attached to the body; an actuator attached to the body; and a plunger movable in a projecting direction toward the outlet by the actuator. The urging member is configured to extend in a separating direction away from the outlet when the plunger is moved toward the outlet.

According to such a configuration, impulse that acts on the body in the projecting direction at the time of driving due to the plunger, the urging member, and the moving member becomes larger than impulse that acts oppositely in the separating direction, and thus it is possible to reduce reaction at the time of driving.

The term "moving distance of the urging member and the moving member" means a moving distance of a member constituted by the urging member and the moving member, and corresponds to a moving distance of a center of gravity of such a member. In a case where the urging member and the moving member move integrally, moving distances of the urging member and the moving member are substantially the same, and thus the "moving distance of the urging member and the moving member" is equal to a moving distance of the urging member or the moving member.

Each of the first to seventh driving tools described above may further include a moving member configured to engage with the separation-side end portion of the urging member and the one end of the connection member (including the string-shaped member), and the connection member (the string-shaped member) may be configured to be attached to the separation-side end portion by the moving member.

Each of the driving tools described above may further include a moving member configured to engage with an end portion side of the urging member, and the urging member may be configured to extend in the separating direction away from the outlet so as to move the moving member in the separating direction and move the plunger in the projecting direction.

In each of the above-described driving tools, mass of the plunger may be larger than a sum of a value obtained by multiplying mass of the urging member by a coefficient that is equal to or higher than 0.3 and equal to or less than 0.7 and mass of the moving member.

In addition, each of the above-described driving tools may further include: a connection member, one end side thereof being attached to the separation-side end portion side of the urging member, which moves in the direction in which the urging member is extended, while the other end side thereof is attached to the plunger; and a direction changing member attached to the body in order to change a direction of a force acting on the plunger by engaging with the connection member between the one end side and the other end side.

Here, the "connection member" is a member that connects the plunger and the urging member. The "connection member" includes, but is not limited to, a string-shaped member.

The "direction changing member" is a member that changes a direction of a force generated by extension of the urging member in the separating direction away from the outlet and causes the force to act on the plunger. The "direction changing member" includes, but is not limited to, a pulley and a gear.

In each of the driving tools described above, the mass of the urging member may be larger than the mass of the plunger, and the mass of the plunger may be larger than the mass of the moving member.

In each of the above-described driving tools, in the first state where the urging member is compressed, the distance between a projecting-side end portion of the urging member, which is attached to the body, and the moving member may be shorter than a distance between the projecting-side end portion and the plunger, and in the second state where the urging member is extended, the distance between the projecting-side end portion and the moving member may be longer than the distance between the projecting-side end portion and the plunger.

In each of the above-described driving tools, in the first state where the urging member is compressed, a distance between the projecting-side end portion of the urging member, which is attached to the body, and the center of gravity of the urging member may be shorter than a distance between the projecting-side end portion and the plunger, and in the second state where the urging member is extended, the distance between the projecting-side end portion and the center of gravity of the urging member may be longer than the distance between the projecting-side end portion and the plunger.

Each of the driving tools described above may further include: a connection member (including the string-shaped member), one end side thereof being attached by the moving member to the separation-side end portion side of the urging member, which moves in the direction in which the urging member is extended, while the other end side thereof is attached to the plunger; and a direction changing member configured to engage with the connection member (the string-shaped member) between the one end side and the other end side so as to change a direction of a force acting on the connection member (the string-shaped member).

In each of the driving tools described above, an urging force in the projecting direction may act on the body from the urging member when the urging member is extended.

The present application discloses a sixth driving tool. The driving tool includes: a body provided with an outlet where a fastener is driven; an urging member attached to the body; a plunger movable in a projecting direction toward the outlet by extension of the urging member; and a moving member that is provided in order to transmit an urging force of the urging member to the plunger, the moving member moving together with the urging member. A product of a moving distance and mass of each of the urging member and the moving member is larger than a product of a moving distance and mass of the plunger. The driving tool includes: Such a driving tool includes the actuator configured to move the plunger and the urging member. The actuator may be any actuator capable of moving the plunger, and may be, for example, a solenoid or the like that drives the plunger by an electromagnetic force. According to such a driving tool, since the urging member extends in the separating direction away from the outlet, a moving direction of a center of gravity of the urging member and a moving direction of the plunger are opposite to each other. Therefore, it is possible to reduce reaction that acts on the body in the direction opposite to the moving direction of the plunger as reaction of the movement of the plunger moved by the actuator.

DESCRIPTION OF EMBODIMENTS

Hereinafter, an embodiment of the present invention will be described with reference to the drawings. The following embodiment is an example for explaining the present invention, and is not intended to limit the present invention only to the embodiment.

First Embodiment

Figure 1:
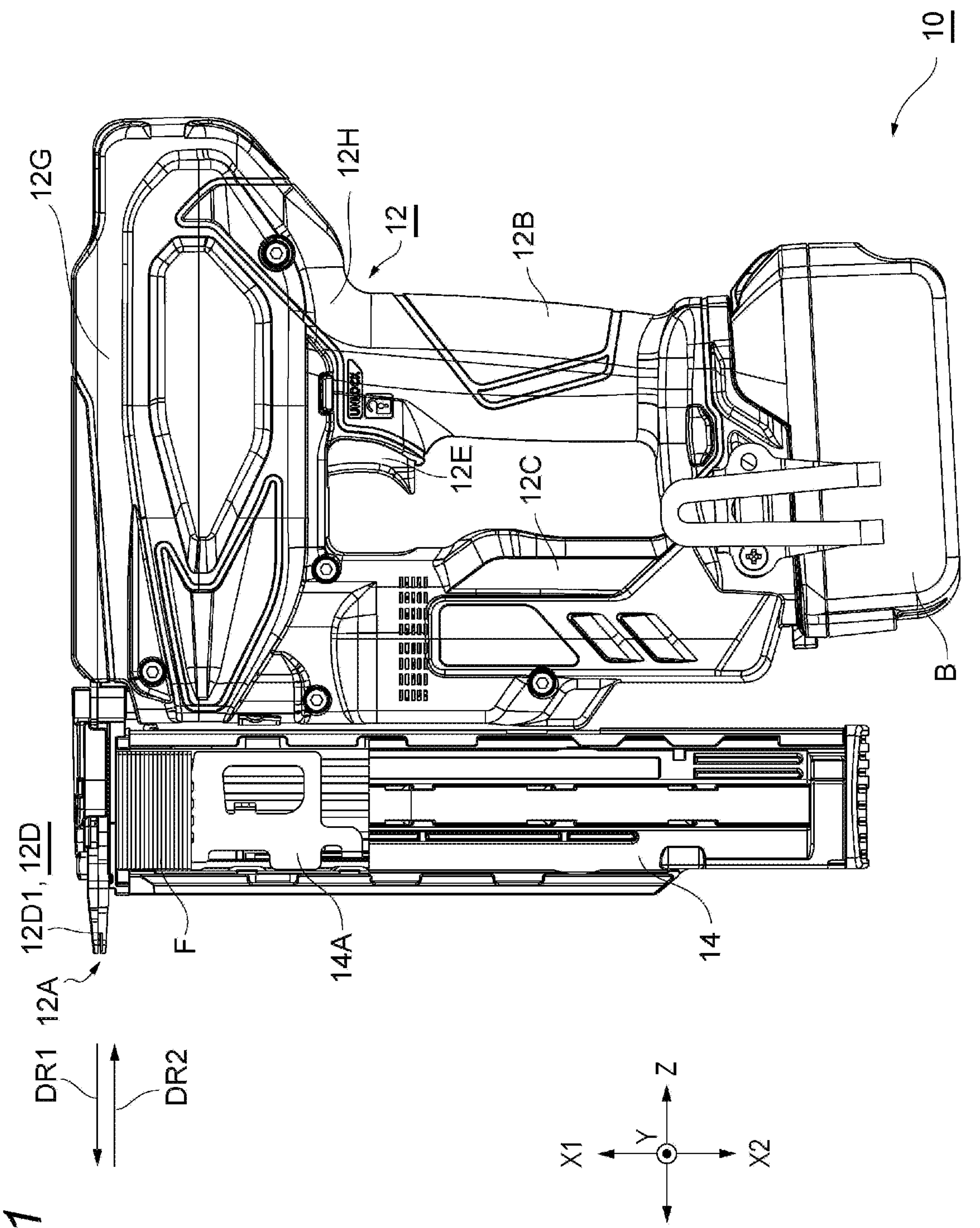
FIG. 1 is a front view of a driving tool according to one embodiment.
Figure 2:
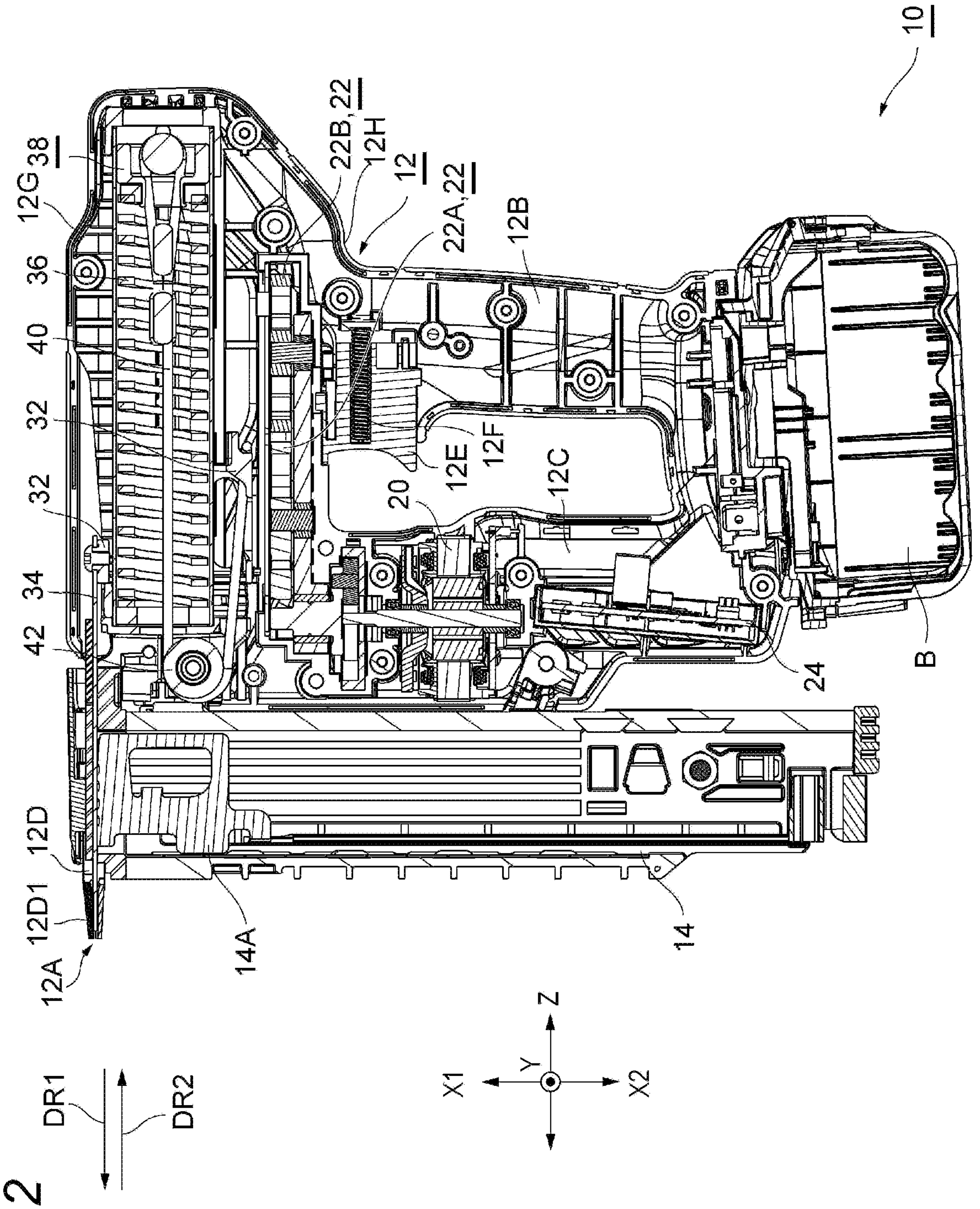
FIG. 2 is a cross-sectional view of the driving tool according to the embodiment.

FIG. 1 shows a front view of an electric driving tool 10 according to a first embodiment (however, a partial cross-sectional view of a magazine 14 is shown). FIG. 2 is a cross-sectional view of the driving tool 10 as viewed from the same direction (however, a state after all fasteners F in the magazine 14 are launched is shown). The driving tool 10 is an electric nailer configured to be capable of driving a nail (an example of the "fastener F") by driving a plunger 32 (FIG. 2) through using a motor 20 (FIG. 2). For convenience, an upward direction on paper in FIG. 1 may be simply referred to as the upward direction or a direction X1, a downward direction on paper may be simply referred to as the downward direction or a direction X2, a rightward direction on paper may be simply referred to as the rightward direction or a direction Z, and a leftward direction on paper may be simply referred to as the leftward direction or the direction Z. The leftward direction on paper in FIG. 1 corresponds to a direction in which the fastener F is launched, and thus may be referred to as a launch direction DR1 or a projecting direction DR1. The rightward direction opposite to the launch direction DR1 may be referred to as a separating direction DR2 since the rightward direction is a direction away from an outlet 12A where the fastener F is launched.

The driving tool 10 includes: a housing 12; the magazine 14 that accommodates the fastener F to be launched by the driving tool 10; a driver 34 configured to launch the fastener F; the plunger 32 to which the driver 34 is attached; the motor 20 and a gear 22 configured to move the plunger 32 from a bottom dead center to a top dead center; a coil spring 36 (an example of an "urging member" to a "driving unit") that applies a driving force for moving the plunger 32 from the top dead center to the bottom dead center; a moving member 38 disposed at an extended end portion of the coil spring 36; a wire 40 (an example of a "string-shaped member" or a "connection member") configured to engage with the plunger 32 and the moving member 38 so as to interlock the plunger 32 and the moving member 38; and a pulley 42 (an example of a "direction changing member") on which the wire 40 is hooked. Further, a battery B is detachably attached to the driving tool 10.

The driving tool 10 includes the housing 12 (hereinafter, the housing 12 and a portion fixed to the housing 12 may be referred to as a "tool body" or simply a "body") that accommodates main components of the driving tool 10 including the plunger 32. The housing 12 is provided with a grip portion 12B to be gripped by an operator, a bridge portion 12C connecting a battery attachment portion to which the battery B is attached and the motor 20, a nose portion 12D configured to launch the fastener F, and a body portion 12G configured to accommodate a plunger assembly 30 including the plunger 32 and the coil spring 36. The grip portion 12B and the bridge portion 12C are each formed in, for example, a columnar shape extending in the up-down direction so as to be easily gripped by the operator. In addition, the grip portion 12B is connected to the body portion 12G (FIG. 1) at a connection portion 12H (FIG. 1). The nose portion 12D where the outlet 12A for launching the fastener F in the leftward direction on paper is formed is provided at a front end of the housing 12 (and a front end of the driving tool 10). A contact arm 12D1 may be attached to a tip end of the nose portion 12D. The contact arm 12D1 is provided around the outlet 12A so as to be capable of projecting and retracting from the outlet 12A, and functions as a safety device that permits the launching of the fastener F only in a state where the contact arm 12D1 is pressed against a driving destination object while a trigger 12E is pressed.

The housing 12 is provided with the trigger 12E. The trigger 12E allows the battery B and the motor 20 to be electrically connected to each other when a user presses the trigger 12E. The trigger 12E is provided to be exposed on a surface that faces forward (toward the launch direction DR1 of the fastener F) of the grip portion 12B, and is urged forward by a trigger urging member 12F such as a spring, for example.

The battery B is configured to be detachably attached to lower end portions of the grip portion 12B and the bridge portion 12C. The battery B functions as a DC power supply that supplies electric power for driving a motor or the like, and is formed of, for example, a lithium ion battery capable of outputting a predetermined (for example, 14V to 20V) DC voltage. The driving tool 10 can be carried and used when the battery B is attached. However, the battery B may also be configured to be accommodated in the housing 12, or the electric power may also be supplied by means other than the battery.

The driving tool 10 includes the magazine 14 attached below the nose portion 12D. The magazine 14 is configured such that a plurality of the fasteners F (FIG. 1) connected to each other can be loaded therein. The magazine 14 includes a pusher 14A that urges each fastener F toward the nose portion 12D. The pusher 14A is urged by an urging member (not shown) such that, when a leading fastener F is launched by the driver 34, an adjacent fastener F is supplied to a projecting path of the nose portion 12D.

Figure 3:
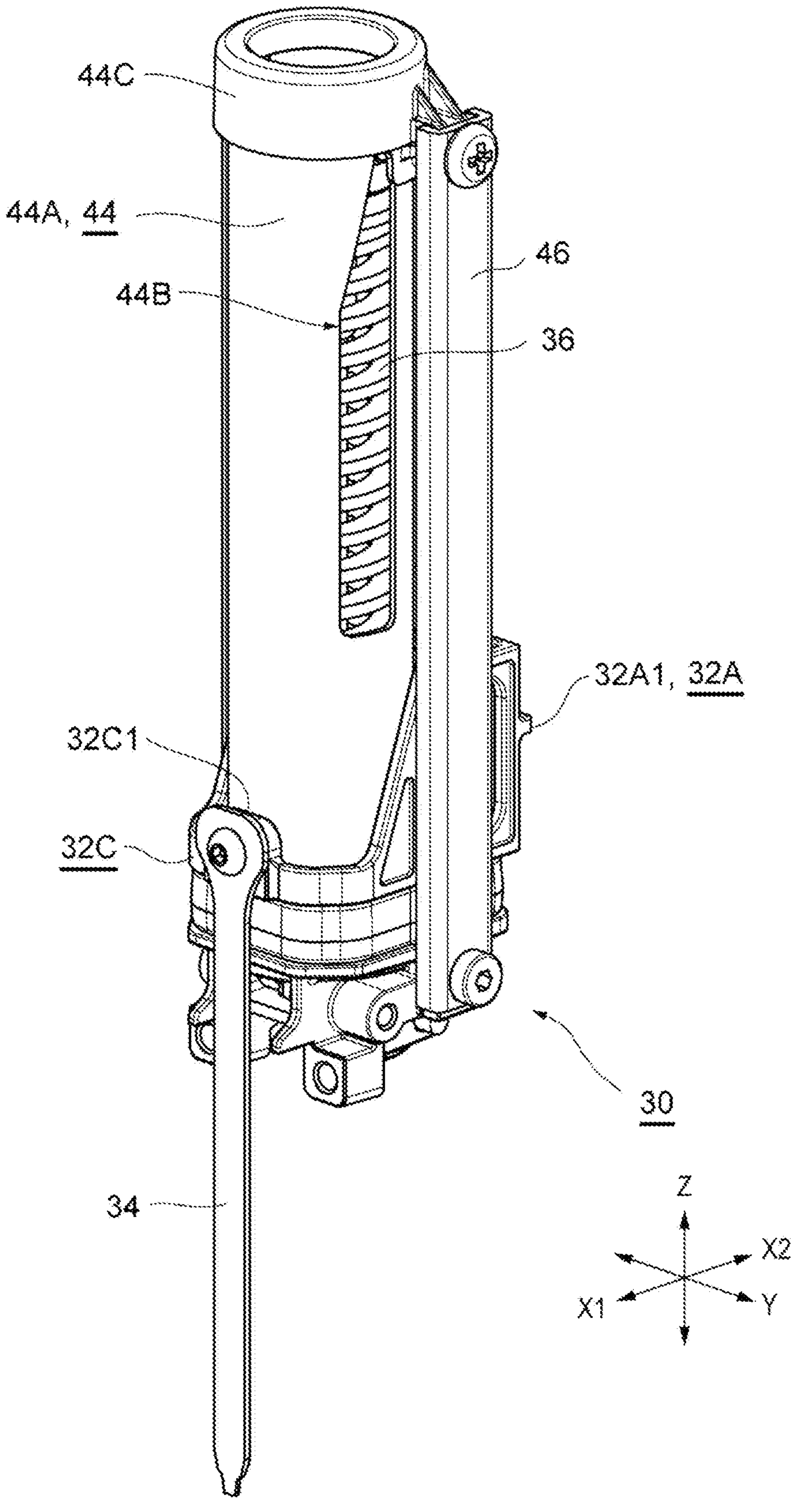
FIG. 3 is a perspective view of a plunger assembly according to the embodiment.
Figure 4:
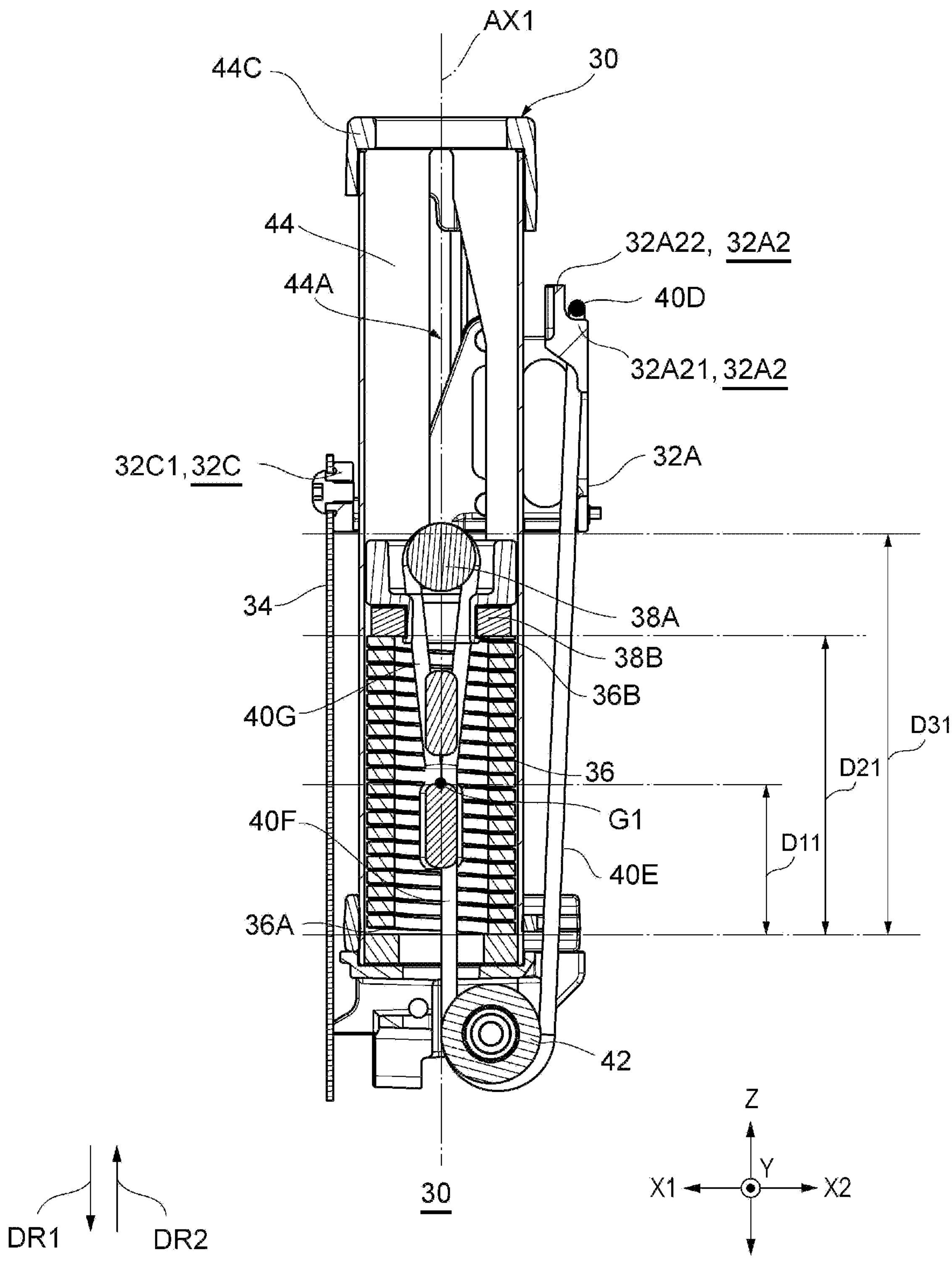
FIG. 4 is a cross-sectional view (a front view) of the plunger assembly according to the embodiment.
Figure 5:
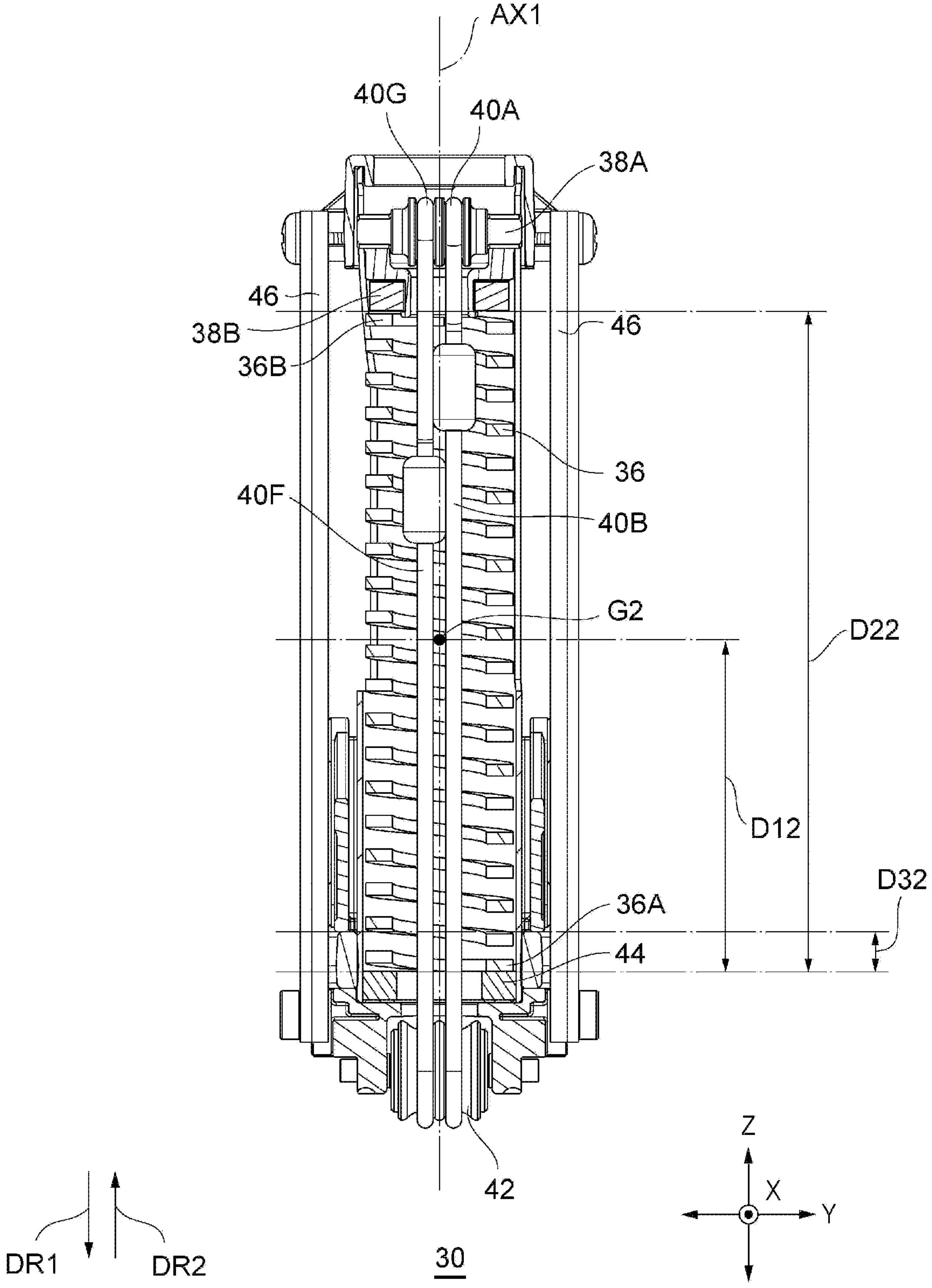
FIG. 5 is a cross-sectional view (a side view) of the plunger assembly according to the embodiment.
Figure 6:
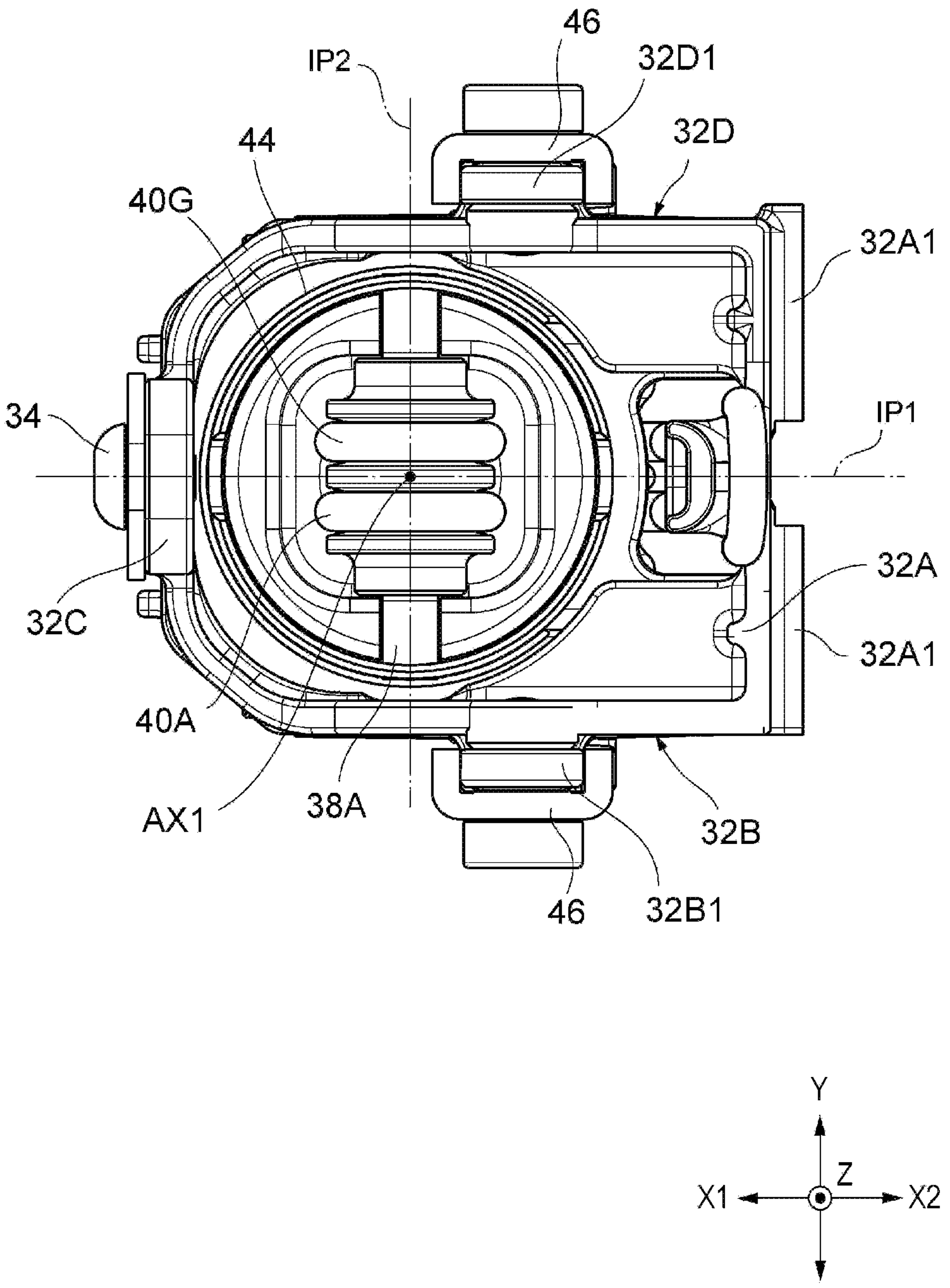
FIG. 6 is a cross-sectional view (a plan view) of the plunger assembly according to the embodiment.
Figure 7:
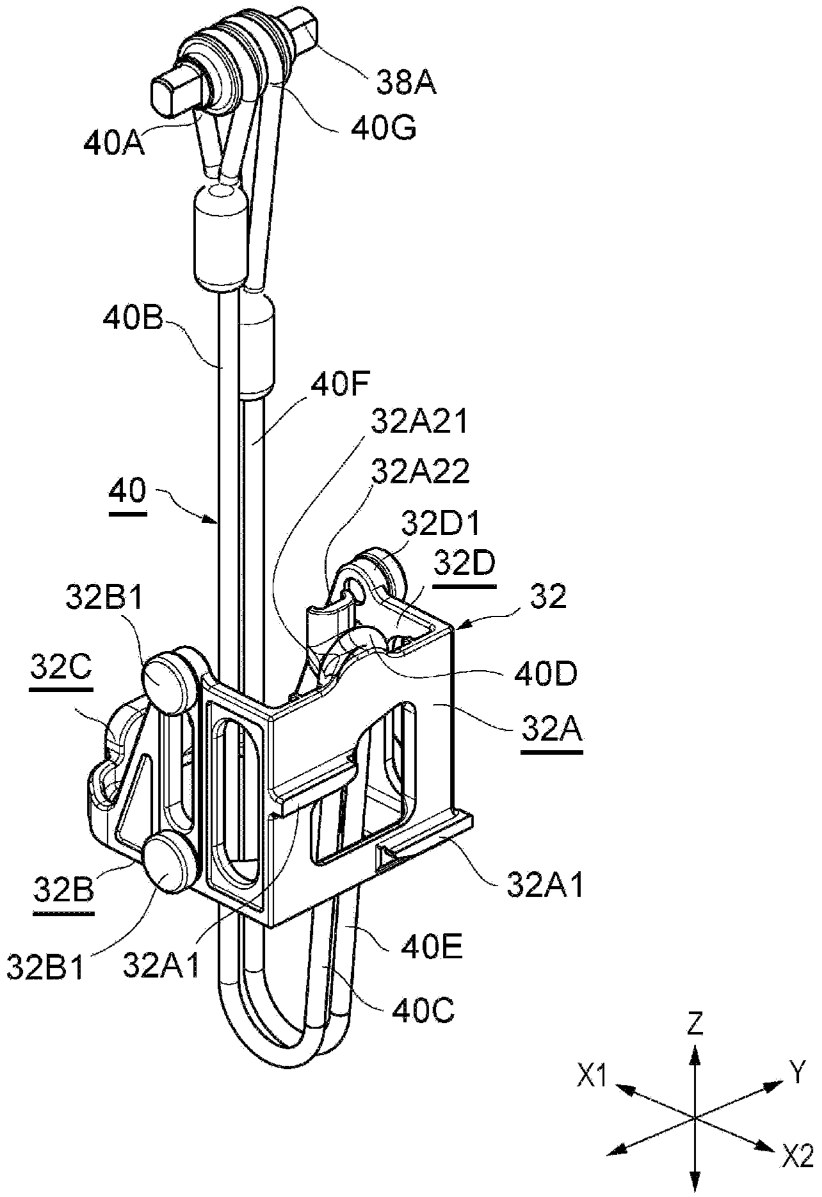
FIG. 7 is a perspective view including a plunger and a wire according to the embodiment.

The driving tool 10 further includes the plunger assembly 30. FIG. 3 is a perspective view of the plunger assembly 30. FIGS. 4 and 5 are cross-sectional views of the plunger assembly 30 in a state where the coil spring 36 is most compressed (an example of a "first state") and in a state where the coil spring 36 is most extended (an example of a "second state") (FIG. 4 is a cross-sectional view in a front view while FIG. 5 corresponds to a cross-sectional view in a left side view). FIGS. 4 and 5 correspond to drawings viewed from a direction perpendicular to an extension direction of the coil spring 36. FIG. 6 is a cross-sectional view of the plunger assembly 30 in a plan view (a top view). FIG. 6 corresponds to a drawing viewed from a direction parallel to the extension direction of the coil spring 36. FIG. 7 is a perspective view showing the plunger 32, a pin 38A that is a part of the moving member 38, and the wire 40 that is engaged with the plunger 32 and the moving member 38. The plunger assembly 30 includes the driver 34, the plunger 32, the coil spring 36, the moving member 38, the wire 40, the pulley 42, and further includes a cylinder 44 that accommodates the coil spring 36, and a pair of guide rails 46 that restrict a moving direction of the plunger 32.

The driver 34 is a member that comes into contact with and strikes the fastener F so as to launch the fastener F. As shown in these drawings, the driver 34 according to the present embodiment is formed of a metal rigid body formed in an elongated rod shape extending in the launch direction DR1 of the fastener F. Since the fastener F is disposed on an extension line of the driver 34, when the driver 34 moves in the launch direction DR1, a front end of the driver 34 strikes the fastener F. A rear end of the driver 34 is connected to the plunger 32 and is configured to move integrally with the plunger 32.

The plunger 32 is a member configured to move from the top dead center to the bottom dead center along a central axis AX1 (an example of a "second axis") so as to move integrally with the driver 34 and launch the fastener F. As shown in FIG. 7, the plunger 32 includes four side wall portions including: a first side wall portion 32A with which the wire 40 is engaged; a second side wall portion 32B that is connected to the first side wall portion 32A substantially at a right angle and is engaged with each guide rail 46; a third side wall portion 32C with which the driver 34 is engaged, the third side wall portion 32C being connected to the second side wall portion 32B substantially at a right angle and provided substantially parallel to the first side wall portion 32A; and a fourth side wall portion 32D that is connected to the third side wall portion 32C and the first side wall portion 32A substantially at a right angle so as to be provided substantially parallel to the second side wall portion 32B, and is engaged with each guide rail 46. The cylinder 44, which will be described later, is disposed in a hollow region surrounded by the four side wall portions. On an outer wall surface of the first side wall portion 32A, gear engagement portions 32A1 that are two convex portions provided at different heights are provided. The plunger 32 is configured to move from the bottom dead center toward the top dead center against an elastic force (an urging force) of the coil spring 36 by engagement between the gear engagement portions 32A1 and the gear 22, which will be described later. Here, the top dead center of the plunger 32 is set in a region on a rear end side of the tool body, and the bottom dead center is set in a region between the top dead center and the nose portion 12D. Therefore, when the plunger 32 moves from the top dead center to the bottom dead center, the plunger 32 moves in the launch direction DR1 so as to approach the outlet 12A, and when the plunger 32 moves from the bottom dead center to the top dead center, the plunger 32 moves in the separating direction DR2 so as to be separated from the outlet 12A.

The first side wall portion 32A of the plunger 32 is further provided with a wire engagement portion 32A2. The wire engagement portion 32A2 includes a first portion 32A21 formed to protrude in an inward direction from an inner wall surface of the first side wall portion 32A (that is, in a direction approaching the third side wall portion 32C), and a second portion 32A22 extending in a direction approaching the top dead center from an end portion of the first portion 32A21. A surface facing the top dead center of the first portion 32A21 serves as a pressure receiving surface configured to apply a force in the launch direction DR1 from the wire 40 to the plunger 32. In addition, the second portion 32A22 restricts the wire 40 from being displaced in the direction approaching the third wall portion. Further, since the first portion 32A21 is formed to protrude in the direction approaching the third side wall portion 32C, the wire 40 engaged with the pressure receiving surface of the first portion 32A21 can be extended along the inner wall surface of the first side wall portion 32A. Therefore, it is also possible to prevent the wire 40 from being displaced in a direction away from the third side wall portion 32C. In addition, the wire engagement portion 32A2 is formed symmetrically relative to a virtual plane IP1 (FIG. 6) that is parallel to planes approximating the second side wall portion 32B and the fourth side wall portion 32D and has the same distance from both planes. With such a configuration, it is possible to prevent the plunger 32 from being inclined due to imbalance of forces acting on the plunger 32 from the wire 40.

The second side wall portion 32B and the fourth side wall portion 32D are formed symmetrically relative to the virtual plane IP1. The second side wall portion 32B and the fourth side wall portion 32D are respectively provided with guide rollers 32B1 and 32D1 configured to engage with the guide rails 46. Since two of the guide rollers 32B1 and 32D1 are provided on the top dead center side and the bottom dead center side, respectively, by engaging each two guide rollers 32B1 and 32D1 with the guide rails 46, respectively, it is possible to prevent the inclination of the plunger 32 at the time of movement.

The third side wall portion 32C is provided with a driver engagement portion 32C1 that is formed symmetrically relative to the virtual plane IP1 and to which the rear end of the driver 34 is connected. Therefore, it is possible to prevent the plunger 32 from inclining due to a reaction force received by the plunger 32 when the driver 34 strikes the fastener F.

As shown in these drawings, the plunger 32 is configured such that a distance between the driver engagement portion 32C1 and the outlet 12A is shorter than a distance between the wire engagement portion 32A2 and the outlet 12A when the moving direction of the plunger 32 (a direction connecting the top dead center and the bottom dead center) is used as a reference.

The cylinder 44 is a member that accommodates the coil spring 36 and guides a moving direction of the pin 38A that forms a part of the moving member 38. The cylinder 44 according to the present embodiment includes a cylindrical portion 44A that is formed in a cylindrical shape, and a cap portion 44C that corresponds to a lid of the cylindrical portion 44A. The cylinder 44 penetrates the hollow region surrounded by the four side wall portions of the plunger 32, and is fixed to the housing 12 such that the moving direction of the plunger 32 and a central axis of the cylinder 44 are substantially parallel to each other while the cap portion 44C fixes the guide rails 46.

The coil spring 36 that is formed of a compression spring that can extend and contract in a direction along the central axis of the cylinder 44, that is, in the moving direction of the plunger 32, is accommodated inside the cylinder 44.

The coil spring 36 is inserted between the moving member 38 and a bottom surface of the cylinder 44. A buffer member such as rubber is inserted between the coil spring 36 and the moving member 38. A buffer member such as rubber is also inserted between the coil spring 36 and the cylinder 44. One end 36A of the coil spring 36 is pressed against the bottom surface of the cylinder on an outlet side (a bottom dead center side of the plunger 32) via the buffer member by the urging force of the coil spring 36. Since the cylinder 44 is fixed to the housing 12, the one end 36A of the coil spring 36 does not move relative to the housing 12 in the projecting direction DR1. The one end 36A of the coil spring 36 may be fixed to the housing 12 through using an adhesive or the like. The moving member 38 is disposed at the other end 36B of the coil spring 36 via the buffer member, and tension is applied to the moving member 38 by the wire 40 toward the one end 36A of the coil spring 36. Therefore, the other end 36B of the coil spring and the moving member 38 are both movable. When the coil spring 36 is compressed from an extended state, the other end 36B of the coil spring and the moving member 38 are moved in the launch direction DR1 along the central axis AX1 (an example of the "first axis"), and when the coil spring 36 is extended and restored from a compressed state, the other end 36B of the coil spring and the moving member 38 are moved in the separating direction DR2 so as to be separated from the outlet 12A along the central axis AX1 (an example of the "first axis"). A pair of holes 44B extending parallel to the central axis, that is, parallel to the extension direction of the coil spring 36, are formed in a wall portion of the cylinder 44.

The moving member 38 is directly or indirectly engaged with a part of the wire 40 so as to move the wire 40 along with extension of the other end 36B of the coil spring. The moving member 38 according to the present embodiment is constituted by a plurality of members that move together, and includes an annular portion 38B that is disposed at the other end 36B of the coil spring, and the pin 38A that is fixed to the annular portion 38B and with which both end portions of the wire 40 are engaged. In the present embodiment, the pair of holes 44B formed in the wall portion of the cylinder 44 are formed so as to intersect with a virtual plane IP2 (FIG. 6) that is parallel to two planes approximating the first side wall portion 32A and the third side wall portion 32C of the plunger 32 and passes through central axes of the cylinder 44 and the coil spring 36. In addition, two end portions of the pin 38A are engaged with the pair of holes 44B such that an extension direction of the pin 38A is substantially parallel to the virtual plane. Therefore, even when the moving member 38 including the pin 38A is moved in the central axis direction of the cylinder 44 in accordance with extension or compression of the coil spring 36, it is possible to prevent the pin 38A from being twisted in a circumferential direction of the cylinder 44.

The wire 40 is a member that is attached to the moving member 38 and the plunger 32 so as to interlock the moving member 38 and the plunger 32. Since the wire 40 is a member that connects the moving member 38 and the plunger 32, the wire 40 may be referred to as a connection member.

In the present embodiment, at one end of the wire 40, a ring shape is formed by connecting one end portion of the wire 40 and a portion separated from the end portion of the wire 40, and the pin 38A is engaged with the wire 40 by penetrating the portion formed in the ring shape. The wire 40 configured to engage with the pin 38A passes through a hole of the annular portion 38B of the moving member 38, extends in the launch direction DR1 along the central axis of the coil spring 36, passes through a hole formed in the bottom surface of the cylinder 44 and is then wound around the pulley 42 so as to change a direction thereof, extends in the separating direction DR2, and engages with the pressure receiving surface of the wire engagement portion 32A2 of the plunger 32. A buffer member may be provided on a shaft portion of the pulley 42. Since the pulley 42 is fixed to the cylinder 44 and the cylinder 44 is fixed to the housing 12, the pulley 42 is fixed to the housing 12 (the tool body). However, the pulley 42 that serves as a direction changing member may also be disposed between the coil spring 36 and the outlet 12A in the projecting direction DR1. For example, the pulley 42 may be provided at a position that is advanced in the projecting direction DR1 relative to the coil spring 36. (including the vicinity of a lower side of the cylinder 44 or the vicinity of the one end 36A that is a fixed end of the coil spring 36) However, the urging member and the direction changing member are not prevented from being provided at different positions in a direction perpendicular to the projecting direction.

Subsequently, the wire 40 extends in the launch direction DR1, then is wound around the pulley 42 so as to change the direction thereof, and extends in the separating direction DR2 along the central axis of the coil spring 36. At the other end of the wire 40, a ring shape is formed by connecting the other end portion of the wire 40 and a portion separated from the end portion of the wire 40, and the pin 38A is engaged with the wire 40 by penetrating the portion formed in the ring shape. Therefore, the both ends of the wire 40 are engaged with the pin 38A, and an intermediate portion of the wire 40 is engaged with the plunger 32. In other words, the portions on both end sides of the wire 40 are attached to the other end 36B of the coil spring 36 via the moving member 38, respectively. In addition, the portions on both end sides of the wire 40 and the moving member 38 are movable together with the other end 36B of the coil spring 36. The intermediate portion of the wire 40 is engaged with the plunger 32.

That is, the wire 40 includes: a first portion 40A (the one end side of the wire 40) including the one end portion configured to engage with the moving member 38; a second portion 40B including a portion that is connected to the first portion 40A and extends in the launch direction DR1; a third portion 40C including a portion that is connected to the second portion 40B and extends substantially in the separating direction; a fourth portion 40D (the intermediate portion of the wire 40) that is connected to the third portion 40C and engages with the plunger 32; a fifth portion 40E including a portion that is connected to the fourth portion 40D and extends substantially in the launch direction DR1; a sixth portion 40F including a portion that is connected to the fifth portion 40E and extends in the separating direction DR2; and a seventh portion 40G (the other end side of the wire 40) including the other end portion that is connected to the sixth portion 40F and engages with the moving member 38.

According to such a configuration, it is possible to improve balance between a force acting on the wire 40 from the moving member 38 and a force acting on the plunger 32 from the wire 40. However, instead of the wire 40, a string-shaped member or another connection unit whose one end side is attached to the other end 36B of the coil spring 36 and whose other end side is attached to the plunger 32 may be used.

A drive mechanism configured to move the plunger 32 from the bottom dead center to the top dead center includes the motor 20 and the gear 22. The motor 20 according to the present embodiment shown in FIG. 2 is constituted by a three-phase DC brushless motor, and is disposed, for example, in the bridge portion 12C such that an output shaft of the motor 20 is substantially perpendicular to the launch direction DR1 and the separating direction DR2. A gear whose rotation shaft is the output shaft of the motor 20 and a first gear 22A constituting the gear 22 mesh with each other, and the first gear 22A meshes with a second gear 22B constituting the gear 22. The first gear 22A is disposed in the separating direction DR2 relative to the gear of the output shaft of the motor 20, and the second gear 22B is disposed in the separating direction DR2 relative to the first gear 22A. Each of the first gear 22A and the second gear 22B is provided with a torque roller (not shown) that is parallel to the rotation shaft and protrudes in a direction approaching the outer wall surface of the first side wall portion 32A of the plunger 32. The torque roller rotates about a central axis of the first gear 22A (the second gear 22B) in accordance with rotation of the first gear 22A (the second gear 22B). Since the central axis of the first gear 22A (the second gear 22B) is parallel to the output shaft of the motor 20, the torque roller reciprocates in the launch direction DR1 and the separating direction DR2 in accordance with the rotation of the first gear 22A (the second gear 22B). When the plunger 32 is located in the vicinity of the bottom dead center, the torque roller of the first gear 22A is engaged with one convex portion provided on the bottom dead center side as the gear engagement portion 32A1. Since the torque roller moves in the separating direction DR2 in accordance with the rotation of the first gear 22A, the gear engagement portion 32A1 of the plunger 32 is pushed up in the separating direction DR2, and thus the plunger 32 can be moved in the separating direction DR2. When the torque roller of the first gear 22A moves farthest in the separating direction DR2, the torque roller of the second gear 22B engages with the other convex portion provided on the top dead center side as the gear engagement portion 32A1. Since the torque roller moves in the separating direction DR2 in accordance with the rotation of the second gear 22B, the gear engagement portion 32A1 of the plunger 32 is further pushed up in the separating direction DR2, and thus the plunger 32 can be further moved in the separating direction DR2. When the torque roller of the second gear 22B moves farthest in the separating direction DR2, the plunger 32 reaches the top dead center, and engagement between the gear engagement portion 32A1 and the second gear 22B is released.

The driving tool 10 further includes a control unit configured to drive the motor 20. The control unit is mounted on a PCB board 24 (FIG. 2) disposed in a gap between the motor 20 and the battery B in the bridge portion 12C. The control unit includes a semiconductor memory element (for example, a NOR flash memory) that stores a computer program, and a processor (for example, a CPU) configured to generate a signal (for example, a PWM signal) for controlling the motor 20 by executing the computer program. Hereinafter, a driving method using the driving tool 10 according to the present embodiment will be described. First, a contact signal indicating whether the contact arm 12D1 is in contact with the driving destination object into which the fastener F is to be driven is shown. When the contact arm 12D1 is pressed in contact with the driving destination object, the contact signal is ON. The CPU receives the contact signal and detects that the contact arm 12D1 is in contact with the object. When the operator presses the trigger 12E, a trigger signal is ON. The CPU receives the trigger signal and detects that the trigger 12E is pressed. When both the trigger SW signal and the contact SW signal are in the ON state, the CPU supplies a PWM signal for driving the motor 20 to an inverter circuit. Each switching element of the inverter circuit performs a switching operation based on the PWM signal from the CPU. When the switching element is ON, an output voltage of the battery B is applied to a three-phase winding constituting a stator of the motor 20, and thus a winding current flows through windings of each phase. A rotor of the motor 20 starts to rotate in accordance with a rotating magnetic field generated by the three-phase winding.

The plunger 32 is stationary at a standby position between the top dead center and the bottom dead center. When the motor 20 starts driving, the torque roller provided in the second gear 22B comes into contact with the gear engagement portion 32A1 of the plunger 32 and pushes up the plunger 32 in the separating direction DR2. Since the plunger 32 is connected to the moving member 38 by the wire 40, the moving member 38 moves in the launch direction DR1 while compressing the coil spring 36 in conjunction with the movement of the plunger 32 in the separating direction DR2. As a result, when shifting from the second state where the coil spring 36 is extended to the first state where the coil spring 36 is compressed, the plunger 32 passes through a position where the connection portion 12H is provided in the launch direction DR1 while moving in the separating direction DR2, and moves to a region on a rear end side of the tool body. Meanwhile, the other end 36B of the coil spring 36 passes through the position where the connection portion 12H is provided in the launch direction DR1 while moving in the projecting direction DR1.

Thereafter, the plunger 32 reaches the top dead center. At this time, engagement between the plunger 32 and the gear 22 is released. Therefore, the coil spring 36 in the compressed state extends at once. Here, since the one end 36A of the coil spring 36 is located on the bottom surface of the cylinder while the bottom surface of the cylinder is fixed to the housing 12, the one end 36A of the coil spring 36 does not move at least in the projecting direction DR2 relative to the tool body. Therefore, the one end 36A may be referred to as a fixed end. On the other hand, since the other end 36B of the coil spring 36 is not fixed to the tool body, the other end 36B is provided to be movable relative to the tool body. Therefore, the other end 36B may be referred to as a moving end. In addition, a direction from the one end 36A to the other end 36B of the coil spring 36 coincides with the separating direction DR2.

Therefore, the coil spring 36 extends in the separating direction DR2. The other end 36B of the coil spring 36 moves in the separating direction DR2 until the other end 36B is extended and restored from the compressed state. The moving member 38 also moves together with the other end of the coil spring 36 in the separating direction DR2 corresponding to the extension direction of the coil spring 36.

While the other end 36B of the coil spring 36 is moved in the separating direction DR2, the one end 36A, which is fixed to the tool body, of the coil spring 36 presses the tool body in the launch direction DR1. Therefore, when the coil spring 36 is extended, an urging force in the launch direction DR1 acts on the tool body from the coil spring 36. Therefore, it is possible to reduce reaction that acts on the body in a direction opposite to the moving direction of the plunger as reaction of the movement of the plunger.

Since the moving member 38 is connected to the plunger 32 by the wire 40, the plunger 32 and the driver 34 are moved in the launch direction DR1 in conjunction with the movement of the moving member 38 in the separating direction DR2.

While the plunger 32 is moving from the top dead center to the bottom dead center, the rotor of the motor 20 continues to rotate. Since a force that hinders the rotation of the motor 20 is released, a rotation speed of the rotor of the motor 20 may increase. When the plunger 32 reaches the vicinity of the bottom dead center, the driver 34 that moves in the launch direction DR1 together with the plunger 32 launches the fastener F supplied to the nose portion 12D in the launch direction DR1. The fastener F is launched from the outlet 12A.

When shifting from the first state where the coil spring 36 is compressed to the second state where the coil spring 36 is extended, the plunger 32 passes through the position where the connection portion 12H is provided in the launch direction DR1 while moving in the projecting direction DR1, and moves to a region on a front end side of the tool body. Meanwhile, the other end 36B of the coil spring 36 passes through the position where the connection portion 12H is provided in the launch direction DR1 while moving in the separating direction DR2, and moves to the region on the rear end side of the tool body.

When the plunger 32 reaches the bottom dead center, the first gear 22A that rotates in synchronization with the rotor of the motor 20 is configured to engage with the gear engagement portion 32A1 of the plunger 32. Therefore, the plunger 32 starts to move from the bottom dead center toward the top dead center. As the plunger 32 moves toward the top dead center, the coil spring 36 is compressed.

When a predetermined condition is satisfied, the CPU starts deceleration control for decelerating the rotation of the motor 20, for example, starts brake control as an example of the deceleration control. Specifically, the CPU generates a PWM signal having a duty ratio smaller than that during normal rotation, and outputs the PWM signal to each switching element of the inverter circuit. The rotation speed of the rotor of the motor 20 is significantly reduced by the deceleration control performed by the CPU. The plunger 32 continues to move slowly toward the top dead center. Thereafter, the rotation of the rotor of the motor 20 is stopped. Timing when the rotation of the motor 20 is stopped can be set as appropriate. For example, a control signal pattern for the brake control may be prepared such that the motor 20 is stopped when the CPU outputs a control signal in accordance with a predetermined pattern to the inverter circuit. As the motor 20 stops, the plunger 32 stops at the standby position between the top dead center and the bottom dead center.

According to the driving tool 10 as described above, when the urging member such as the coil spring 36 is extended, the urging force in the projecting direction DR2 acts on the tool body from the one end 36A of the coil spring 36 (referred to as "Configuration 1").

Therefore, when the coil spring 36 is extended, the urging force in the projecting direction DR1 acts on the tool body from the one end 36A of the coil spring 36. Therefore, it is possible to reduce reaction that acts on the body in the direction opposite to the moving direction of the plunger 32 as reaction that occurs when the plunger 32 moves from the top dead center to the bottom dead center and strikes the fastener F.

In addition to the driving tool 10, Configuration 1 can be applied to a driving tool including a body provided with an outlet where a fastener is driven, an urging member attached to the body, and a plunger movable in a projecting direction toward the outlet by extension of the urging member.

Further, since the driving tool 10 has the following configurations, the driving tool 10 exerts the following operational effects. All of these configurations do not need to be mounted on the same driving tool, and the configurations may be mounted on different driving tools, or a plurality of the configurations may be mounted on the same driving tool.

Configuration 2

Configuration 2 is a configuration in which, in the first state (FIG. 4) in which the urging member such as the coil spring 36 is compressed in the driving tool 10, a distance (D21) between the one end 36A (an example of a "projecting-side end portion") of the coil spring 36 and the moving member 38 is shorter than a distance (D31) between the one end 36A of the coil spring 36 and the plunger 32, and in the second state (FIG. 5) in which the urging member such as the coil spring 36 is extended, a distance (D22) between the one end 36A of the coil spring 36 and the moving member 38 is longer than a distance (D32) between the one end 36A of the coil spring 36 and the plunger 32. Here, the distance is based on a compression and extension direction of the coil spring 36 and the like.

According to such a driving tool, a region in which the urging member is extended and a region in which the plunger is moved in accordance with the extension of the urging member at least partially overlap each other, and thus it is possible to reduce a size of the driving tool.

In the driving tool 10 according to the present embodiment, the pulley 42 is disposed in a gap between the outlet 12A and the one end 36A of the coil spring 36 (an example of the "projecting-side end portion") with reference to the compression and extension direction of the coil spring 36 and the like or the projecting direction. Therefore, in the second state, the plunger 32 can be brought close to the outlet 12A until a front end of the plunger 32 in the projecting direction DR1 is located in the gap between the outlet 12A and the one end 36A (an example of the "projecting-side end portion") of the coil spring 36.

In addition, in the driving tool 10, since the urging member such as the coil spring 36 is disposed in the region surrounded by the plunger 32 in a plan view (FIG. 6) as viewed from the compression and extension direction of the coil spring 36 and the like, it is possible to further reduce the size of the driving tool. Further, since the coil spring 36 and the plunger 32 are disposed at the positions close to each other, it is possible to reduce a moment generated due to striking of the fastener.

Further, in the driving tool 10, when the coil spring 36 extends along the first axis and the plunger 32 moves along the second axis, the first axis and the second axis are coaxial with each other, that is, coincide with the central axis AX1. Such a configuration also contributes to the reduction of the moment generated due to the striking of the fastener. However, the first axis and the second axis are not necessarily coaxial with each other, and for example, the first axis and the second axis may overlap each other in a side view as viewed from the direction perpendicular to the extension direction of the coil spring 36 that serves as the urging member.

According to such a configuration as well, in the side view in which at least the first axis and the second axis overlap each other, the plunger and the urging member are disposed at positions spaced apart from each other, and thus it is possible to reduce the moment generated due to the striking of the fastener. In addition, even when the first axis and the second axis do not overlap each other in the side view, it is possible to reduce the moment by bringing the coil spring 36, which is the urging member, and the plunger close to each other.

For example, in the top view of FIG. 6, a minimum distance (minimum interval) between the urging member and the plunger may be configured to be shorter than a maximum length of the urging member in the top view (a diameter of the coil spring 36 in the case where the urging member is the coil spring 36), preferably shorter than a half of the maximum length of the urging member in the top view (a radius of the coil spring 36 in the case where the urging member is the coil spring 36). In addition to the driving tool 10 according to the present embodiment, Configuration 2 can be applied to a driving tool including a body provided with an outlet where a fastener is driven, an urging member including a projecting-side end portion that is attached to the body and a separation-side end portion that is not attached to the body, a moving member engaged with the separation-side end portion, and a plunger movable in a projecting direction toward the outlet by extension of the urging member.

Configuration 3

Configuration 3 is a configuration in which, in the first state (FIG. 4) in which the urging member such as the coil spring 36 is compressed in the driving tool 10, a distance (D11) between the one end 36A (an example of the "projecting-side end portion") of the coil spring 36 and a center of gravity G1 of the urging member such as the coil spring 36 is shorter than the distance (D31) between the one end 36A of the coil spring 36 and the plunger 32, and in the second state (FIG. 5) in which the urging member such as the coil spring 36 is extended, a distance (D12) between the one end 36A of the coil spring 36 and a center of gravity G2 of the urging member such as the coil spring 36 is larger than the distance (D32) between the one end 36A of the coil spring 36 and the plunger 32. Here, the distance is based on the compression and extension direction of the coil spring 36 and the like. In addition, the center of gravity of the coil spring 36 corresponds to a center position between the one end 36A and the other end 36B on the central axis.

According to such a driving tool, a region in which the center of gravity is moved due to the extension of the urging member and the region in which the plunger is moved at least partially overlap with each other with reference to the compression and extension direction of the coil spring 36 and the like, and thus it is possible to reduce the size of the driving tool. In addition, since the center of gravity of the urging member moves in the separating direction relative to the body, it is possible to reduce the reaction that acts on the body in the direction opposite to the moving direction of the plunger as the reaction of the movement of the plunger.

In addition to the driving tool 10 according to the present embodiment, Configuration 3 can be applied to a driving tool including a body provided with an outlet where a fastener is driven, an urging member including a projecting-side end portion that is attached to the body and a separation-side end portion that is not attached to the body, and a plunger movable in a projecting direction toward the outlet by extension of the urging member.

Configuration 4

Configuration 4 is a configuration in which, when the driving tool 10 shifts from the first state (FIG. 4) in which the urging member such as the coil spring 36 is compressed to the second state (FIG. 5) in which the urging member is extended, a moving direction of the center of gravity of the urging member (a direction from G1 to G2) and the movement of the plunger (a direction from the top dead center to the bottom dead center) are opposite to each other. To be opposite means that the directions are different from each other by approximately 180 degrees.

According to such a driving tool, since the moving direction of the center of gravity of the urging member and the moving direction of the plunger are opposite to each other, it is possible to reduce the reaction that acts on the body in the direction opposite to the moving direction of the plunger as the reaction of the movement of the plunger.

In addition to the driving tool 10 according to the present embodiment, Configuration 4 can be applied to a driving tool including a body provided with an outlet where a fastener is driven, an urging member including a projecting-side end portion that is attached to the body and a separation-side end portion that is not attached to the body, and a plunger configured to project the fastener from the outlet by extension of the urging member.

Configuration 5

Configuration 5 is a configuration of the driving tool 10 including the body provided with the outlet 12A where the fastener F is driven, the urging member such as the coil spring 36 attached to the body, and the plunger 32 movable in the projecting direction DR1 toward the outlet 12A by extension of the urging member, in which the urging member extends in the separating direction DR2 away from the outlet 12A.

According to such a driving tool, since the urging member extends in the separating direction DR2 away from the outlet 12A, the moving direction of the center of gravity of the urging member (corresponding to the separating direction DR2) and the moving direction of the plunger (corresponding to the launch direction DR1) are opposite to each other. Therefore, with such a configuration, it is still possible to reduce the reaction that acts on the body in the direction opposite to the moving direction of the plunger as the reaction of the movement of the plunger.

In addition to the driving tool 10 according to the present embodiment, Configuration 5 can be applied to a driving tool including a body provided with an outlet where a fastener is driven, an urging member attached to the body, and a plunger movable in a projecting direction toward the outlet by extension of the urging member.

Modification 1

In a driving tool having at least one of Configurations 1 to 5 described above, mass of the urging member such as the coil spring 36 may be larger than mass of the plunger 32, and the mass of the plunger 32 may be larger than mass of the moving member 38.

For example, the mass of the urging member such as the coil spring 36 may be 40 to 100 grams, the mass of the plunger 32 may be 20 to 40 grams, and the mass of the moving member 38 may be 5 to 20 grams. In this case, a portion occupying 50% or more of a volume of components constituting the moving member 38 may be made of resin. For example, the pin 38A of the moving member 38 may be made of metal, and components other than the pin 38A may be made of resin.

Since reaction becomes smaller as mass of the entire body becomes larger, a counterweight in a driving tool in related art is designed to increase the mass of the entire body by intentionally making the mass larger than at least one of the urging member and the plunger so as to reduce the reaction. However, according to the configuration according to the present modification, since it is possible to reduce the reaction without relying on the counterweight, it is possible to reduce weight of the moving member 38, and thus it is possible to reduce weight of the driving tool. Meanwhile, the urging member such as the coil spring 36 can be configured to have larger mass in order to reduce the reaction, and thus the urging force can be increased. Therefore, by increasing the mass of the urging member such as the coil spring 36 instead, it is possible to reduce the reaction and increase the urging force.

However, the driving tool according to the present application may be configured by additionally mounting a counterweight or the like in the driving tool including at least one of Configurations 1 to 5 without employing Modification 1.

In addition, in a driving tool having at least one of Configurations 1 to 5 described above, or in the configuration according to the modification described above, the mass of the plunger 32 may be larger than a value obtained by multiplying the mass of the urging member such as the coil spring 36 by a coefficient that is equal to or higher than 0.3 and equal to or less than 0.7 and the mass of the moving member 38.

According to such a configuration, since it is possible to reduce the reaction without relying on the counterweight, it is possible to reduce the weight of the moving member 38, and thus it is possible to reduce the weight of the driving tool.

Modification 2

A driving tool according to the present modification does not necessarily include at least one of Configurations 1 to 5.

However, constituent elements that may have the same or similar functions or configurations as constituent elements in the other disclosures will be denoted by the same or similar reference numerals.

The driving tool includes a tool body provided with the outlet 12A where the fastener F is driven, an urging member attached to the tool body, an actuator attached to the tool body, and a plunger movable in the projecting direction DR1 toward the outlet 12A by the actuator, and the urging member is configured to extend in a separating direction away from the outlet 12A when the plunger is moved toward the outlet 12A.

The actuator may be any actuator as long as the actuator can move the plunger, and may be, for example, an actuator that drives the plunger by an electromagnetic force, such as a solenoid, or may be an actuator that drives the plunger through using air pressure or the like. According to such a driving tool, when the plunger is moved toward the outlet 12A, the urging member extends in the separating direction DR2 away from the outlet 12A, and thus a moving direction of a center of gravity of the urging member and a moving direction of the plunger are opposite to each other. Therefore, it is possible to reduce reaction that acts on the body in the direction opposite to the moving direction of the plunger as reaction of the movement of the plunger moved by the actuator.

In the above disclosure, the urging member can adopt a known configuration capable of applying an urging force, and may be, for example, a plate spring, a disc spring, a leg spring, a torsion bar spring, or the like.

In addition, a method for attaching the string-shaped member or the connection member such as the wire 40 to the urging member such as the coil spring 36 may be achieved by various methods. For example, the wire 40 or the like and the coil spring 36 or the like may be directly adhered to each other through using an adhesive, or may be attached to each other via another member. In addition, in a portion of the urging member, an end of the urging member does not necessarily have to be in contact with the string-shaped member, the moving member, or the like. For example, in a portion of the urging member, an end-portion-side region including an end may be attached to be in contact with the string-shaped member, the moving member, or the like.

In addition, various modifications can be made to the present invention without departing from the gist thereof. For example, a part of the constituent elements in one embodiment may be added to other embodiments within the range of a normal creative ability of those skilled in the art. In addition, a part of the constituent elements in one embodiment can be replaced by corresponding constituent elements in other embodiments.

The invention claimed is:

1. A driving tool comprising:

a body provided with an outlet where a fastener is driven;

an urging member attached to the body; and a plunger movable in a projecting direction toward the outlet by extension of the urging member in a separating direction away from the outlet for a duration of movement of the plunger in the projecting direction, wherein an urging force in the projecting direction acts on the body from the urging member when the plunger is moved in the projecting direction, and wherein the urging force in the projecting direction that acts on the body from the urging member, is a resultant force of urging forces generated by the urging member.

2. The driving tool according to claim 1, wherein the driving tool further comprises:

a connection member, one end side of the connection member being attached to a separation-side end portion side of the urging member, which moves in a direction in which the urging member is extended, the other end side of the connection member being attached to the plunger; and a direction changing member configured to engage with the connection member between the one end side and the other end side so as to change a direction of a force acting on the connection member.

3. The driving tool according to claim 2, further comprising:

a moving member configured to engage with the separation-side end portion side of the urging member and the one end side of the connection member, wherein the connection member is configured to be attached to the separation-side end portion side by the moving member.

4. The driving tool according to claim 1, wherein the urging member is configured to extend on a first axis, the plunger is configured to move on a second axis when the urging member is extended on the first axis, and in a side view as viewed from a direction perpendicular to the direction in which the urging member is extended, the first axis and the second axis overlap each other.

5. The driving tool according to claim 1, wherein the urging member includes a projecting-side end portion that is attached to the body and a separation-side end portion that is not attached to the body, the driving tool further includes a moving member configured to engage with the separation-side end portion, in a first state where the urging member is compressed, a distance between the projecting-side end portion and the moving member is shorter than a distance between the projecting-side end portion and the plunger, and in a second state where the urging member is extended, the distance between the projecting-side end portion and the moving member is longer than the distance between the projecting-side end portion and the plunger.

6. The driving tool according to claim 1, wherein the urging member includes a projecting-side end portion that is attached to the body and a separation-side end portion that is not attached to the body, in a first state where the urging member is compressed, a distance between the projecting-side end portion and a center of gravity of the urging member is shorter than a distance between the projecting-side end portion and the plunger, and in a second state where the urging member is extended, the distance between the projecting-side end portion and the center of gravity of the urging member is longer than the distance between the projecting-side end portion and the plunger.

7. The driving tool according to claim 1, wherein the urging member includes a projecting-side end portion that is attached to the body and a separation-side end portion that is not attached to the body, and when a first state where the urging member is compressed is shifted to a second state where the urging member is extended, a direction in which a center of gravity of the urging member is moved and a direction in which the plunger is moved are opposite to each other.

8. A driving tool comprising:

an urging member;

a plunger movable in a projecting direction toward an outlet by extension of the urging member in a separating direction away from the outlet for a duration of movement of the plunger in the projecting direction; and a body including a body portion that accommodates the urging member and the plunger, and a grip portion connected to the body portion, wherein the urging member is configured such that when a second state where the urging member is extended is shifted to a first state where the urging member is compressed, an end portion of the urging member, which is located in the separating direction away from the outlet, is compressed so as to pass through a position where a connection portion connecting the grip portion and the body portion is provided in a projecting direction, when the first state is shifted to the second state, the end portion of the urging member is extended in the separating direction so as to pass through the position where the connection portion is provided in the projecting direction, wherein an urging force in the projecting direction acts on the body from the urging member when the plunger is moved in the projecting direction, and wherein the urging force in the projecting direction that acts on the body from the urging member, is a resultant force of urging forces generated by the urging member.

9. The driving tool according to claim 8, further comprising:

a connection member, one end side of the connection member being attached to a separation-side end portion side of the urging member, which moves in a direction in which the urging member is extended, the other end side of the connection member being attached to the plunger; and a direction changing member attached to the body in order to change a direction of a force acting on the plunger by engaging with the connection member between the one end side and the other end side.

10. The driving tool according to claim 9, further comprising:

a moving member configured to engage with the separation-side end portion side of the urging member and the one end side of the connection member, wherein the connection member is configured to be attached to the separation-side end portion side by the moving member.

11. The driving tool according to claim 10, wherein, in the first state where the urging member is compressed, a distance between a projecting-side end portion of the urging member, which is attached to the body, and the moving member is shorter than a distance between the projecting-side end portion and the plunger, and in the second state where the urging member is extended, the distance between the projecting-side end portion and the moving member is longer than the distance between the projecting-side end portion and the plunger.

12. The driving tool according to claim 10, wherein in the first state where the urging member is compressed, a distance between a projecting-side end portion of the urging member, which is attached to the body, and a center of gravity of the urging member is shorter than a distance between the projecting-side end portion and the plunger, and in the second state where the urging member is extended, the distance between the projecting-side end portion and the center of gravity of the urging member is longer than the distance between the projecting-side end portion and the plunger.

13. The driving tool according to claim 8, wherein, when the urging member is extended, an urging force in the projecting direction acts on the body from the urging member.

14. The driving tool according to claim 8, further comprising:

a moving member configured to engage with an end portion side of the urging member, wherein the urging member is configured to extend in the separating direction away from the outlet so as to move the moving member in the separating direction and move the plunger in the projecting direction.

15. The driving tool according to claim 14, further comprising:

a connection member, one end side of the connection member being attached by the moving member to a separation-side end portion side of the urging member, which moves in the separating direction in which the urging member is extended, the other end side of the connection member being attached to the plunger; and a direction changing member configured to engage with the connection member between the one end side and the other end side so as to change a direction of a force acting on the connection member.

16. The driving tool according to claim 14, wherein in the first state where the urging member is compressed, a distance between a projecting-side end portion of the urging member, which is attached to the body, and the moving member is shorter than a distance between the projecting-side end portion and the plunger, and in the second state where the urging member is extended, the distance between the projecting-side end portion and the moving member is longer than the distance between the projecting-side end portion and the plunger.

17. The driving tool according to claim 15, wherein in the first state where the urging member is compressed, a distance between a projecting-side end portion of the urging member, which is attached to the body, and a center of gravity of the urging member is shorter than a distance between the projecting-side end portion and the plunger, and in the second state where the urging member is extended, the distance between the projecting-side end portion and the center of gravity of the urging member is longer than the distance between the projecting-side end portion and the plunger.

18. The driving tool according to claim 14, wherein, when the urging member is extended, an urging force in the projecting direction acts on the body from the urging member.

19. A driving tool comprising:

a body provided with an outlet where a fastener is driven;

an urging member attached to the body;

a motor attached to the body; and a plunger movable in a separating direction away from the outlet by the motor, wherein the plunger is moved in a projecting direction toward the outlet by extension of the urging member in the separating direction away from the outlet for a duration of movement of the plunger in the projecting direction, wherein an urging force in the projecting direction acts on the body from the urging member when the plunger is moved in the projecting direction, and wherein the urging force in the projecting direction that acts on the body from the urging member, is a resultant force of urging forces generated by the urging member.

20. The driving tool according to claim 19, further comprising a moving member that is provided in order to transmit an urging force of the urging member to the plunger, the moving member moving together with the urging member, wherein a product of a moving distance and mass of each of the urging member and the moving member is larger than a product of a moving distance and mass of the plunger.

* * * * *